(12) United States Patent
Forde et al.

(10) Patent No.: US 10,423,243 B2
(45) Date of Patent: Sep. 24, 2019

(54) INTEGRATED KEY PLATE FOR AN INPUT DEVICE

(71) Applicant: Logitech Europe S.A., Lausanne OT (CH)

(72) Inventors: Kevin Forde, Cork (IE); Niall White, Golden (IE); York Chang, Hsinchu (TW); Tony Lai, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 215 days.

(21) Appl. No.: 15/453,744

(22) Filed: Mar. 8, 2017

(65) Prior Publication Data

US 2018/0260043 A1 Sep. 13, 2018

(51) Int. Cl.
| | |
|---|---|
| G06F 3/0354 | (2013.01) |
| G06F 3/0362 | (2013.01) |
| G06F 3/01 | (2006.01) |
| G06F 3/02 | (2006.01) |
| G06F 3/03 | (2006.01) |
| G06F 3/0346 | (2013.01) |

(52) U.S. Cl.
CPC .......... *G06F 3/03543* (2013.01); *G06F 3/017* (2013.01); *G06F 3/02* (2013.01); *G06F 3/0304* (2013.01); *G06F 3/0346* (2013.01); *G06F 3/0362* (2013.01); *G06F 3/03547* (2013.01)

(58) Field of Classification Search
CPC ........ G06F 3/03543; G06F 3/017; G06F 3/02; G06F 3/0304; G06F 3/03547; G06F 3/0362; G01L 5/22
See application file for complete search history.

(56) References Cited

U.S. PATENT DOCUMENTS

| | | | |
|---|---|---|---|
| 9,369,825 B2 | 6/2016 | Bell | |
| 2017/0220139 A1 | 8/2017 | Forde et al. | |
| 2017/0249024 A1* | 8/2017 | Jackson | G06F 3/03543 |
| 2018/0136728 A1* | 5/2018 | Unnikrishnan | G06F 3/016 |

OTHER PUBLICATIONS

U.S. Provisional Application filed Feb. 1, 2016 for U.S. Appl. No. 62/289,894, 44 pages.

* cited by examiner

*Primary Examiner* — Robert J Michaud
(74) *Attorney, Agent, or Firm* — Kilpatrick Townsend & Stockton LLP

(57) ABSTRACT

An input device can include a chassis, a housing coupled to the chassis and forming a top surface of the input device, a depressible key plate integrated with and forming a part of the housing, a biasing mechanism (e.g., a spring) disposed within the housing and coupled to a bottom portion of the key plate to provide a downward force on the key plate, and a force sensor (e.g., switch) disposed in the chassis and in contact with the bottom portion of the key plate to activate in response to receiving a threshold force by the bottom surface of the key plate. The key plate may depress in response to receiving at least a predetermined depression force on the top surface. In some cases, the downward force provided by the biasing mechanism can be substantially equal to the predetermined depression force.

14 Claims, 8 Drawing Sheets

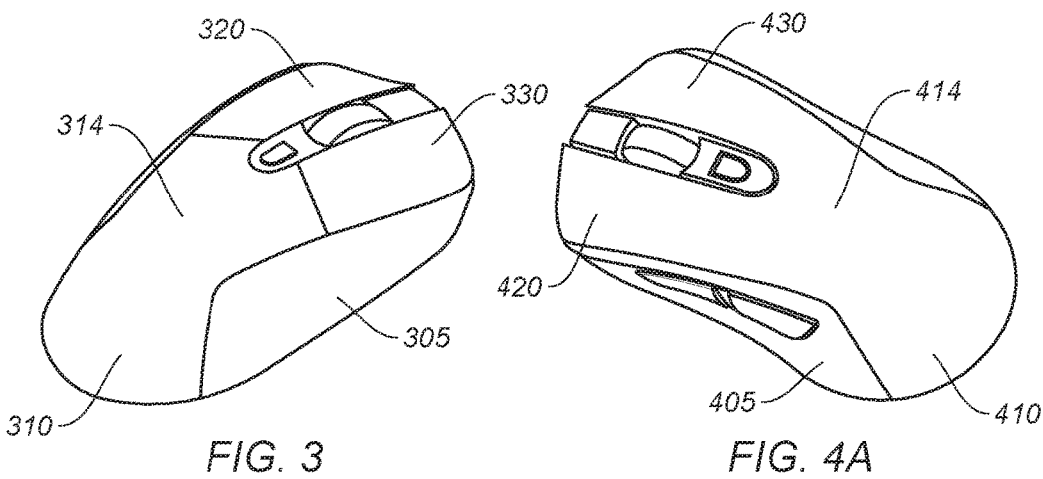
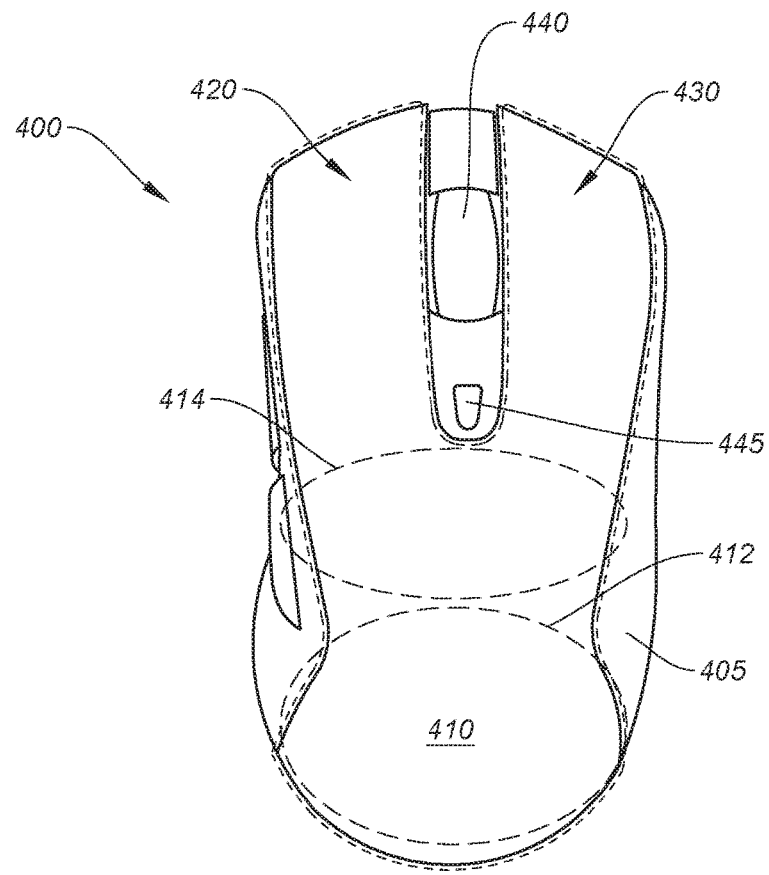
FIG. 3
FIG. 4A
FIG. 4B

INTEGRATED KEY PLATE FOR AN INPUT DEVICE

BACKGROUND

Input devices are ubiquitous in modern culture and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, remote controls, gaming controllers, joysticks, trackballs, and the like. Some non-limiting examples of computing systems include desktops, laptops, tablets and "phablet" computers, smart phones, personal digital assistants (PDA), wearable devices (e.g., smart watches, glasses), and the like.

Some input devices are designed to conform to the general needs of the population for a basic, low-cost, functional design. However, basic functionality may not provide enough utility for more discerning users. Those in the computer gaming community typically expect high performance input devices to meet their expectations in terms of features, functionality, ergonomics, reliability, and precision over extended periods of use. Better products are needed in this market space.

BRIEF SUMMARY

In certain embodiments, an input device includes a chassis, a housing coupled to the chassis and forming a top surface of the input device, a depressible key plate integrated with and forming a part of the housing, a biasing mechanism (e.g., spring) disposed within the housing and coupled to the bottom portion of the key plate, and a force sensor (e.g., actuator) disposed in the chassis and in contact with the bottom portion of the key plate. In some cases, the force sensor can activate in response to receiving a threshold force by the bottom portion of the key plate, the biasing mechanism can provide a downward force on the key plate, and the key plate can include a top portion forming a part of the top surface of the input device and a bottom portion. The key plate may depress in response to receiving at least a depression force on the top surface and the downward force provided by the biasing mechanism is substantially equal to the depression force.

In some embodiments, the housing can further includes a knuckle support region, where the key plate can be a cantilever beam such that the key plate depresses with respect to the knuckle support region of the housing. The input device may further include a support assembly disposed under the housing, the support assembly including a first support end coupled to a bottom portion of the housing in the knuckle support region, and a second support end that extends to the bottom portion of the key plate without contacting the bottom portion of the key plate, where the biasing mechanism can be further coupled to the second support end to provide an anchor point for providing the downward force on the key plate. In some cases, the biasing mechanism can be further coupled to the chassis to provide an anchor point for providing the downward force on the key plate.

In further embodiments, the input device can include a second depressible key plate integrated with and forming a part of the housing, the second key plate including a top portion forming a second part of the top surface of the input device, and a bottom portion, a second biasing mechanism disposed within the housing and coupled to the bottom portion of the second key plate, the second biasing mechanism to provide a downward force on the second key plate, and a second force sensor disposed in the chassis and in contact with the bottom portion of the second key plate, the second force sensor to activate in response to receiving a second threshold force by the bottom portion of the second key plate. In some implementations, the second key plate depresses in response to receiving at least a second depression force on the top surface, and the downward force provided by the second biasing mechanism may be substantially equal to the second predetermined depression force. In some cases, the depression force and the second depression force may not be substantially equal.

In some embodiments, an apparatus includes a housing coupled to a chassis of a computer mouse, the housing forming a top surface of the computer mouse, a depressible key plate integrated with and forming a part of the housing, the key plate including a top portion forming a part of the top surface of the computer mouse and a bottom portion, and a biasing mechanism (e.g., a spring) disposed within the housing and coupled to the bottom portion of the key plate, the biasing mechanism to provide a downward force on the key plate. In some cases, the bottom portion of the key plate, when the housing is coupled to the chassis, contacts a force sensor (e.g., actuator) disposed in the chassis. The key plate may depress in response to receiving at least a depression force on the top surface, and the downward force provided by the biasing mechanism may be substantially equal to the depression force. In certain embodiments, the housing can further include a knuckle support region, where the key plate may be a cantilever beam such that the key plate depresses with respect to the knuckle support region of the housing. The apparatus may further include a support assembly disposed under the housing, the support assembly including a first support end coupled to a bottom portion of the housing in the knuckle support region, and a second support end that extends to the bottom portion of the key plate without contacting the bottom portion of the key plate, where the biasing mechanism may be further coupled to the second support end to provide an anchor point for providing the downward force on the key plate. Alternatively or additionally, the biasing mechanism may be configured to couple to the chassis to provide an anchor point for providing the downward force on the key plate.

In certain embodiments, a computer mouse includes a chassis, a housing coupled to the chassis and forming a top surface of the computer mouse, a depressible key plate integrated with and forming a part of the housing, the key plate including a top portion forming a part of the top surface of the input device and a bottom portion, a spring mechanism disposed within the housing and coupled to the bottom portion of the key plate, the spring mechanism to provide a downward force on the key plate, and an actuator disposed in the chassis and in contact with the bottom portion of the key plate, the actuator to activate in response to receiving a threshold force by the bottom surface of the key plate. The key plate may depress in response to receiving at least a depression force on the top surface. In some cases, the downward force provided by the spring mechanism can be substantially equal to the depression force.

BRIEF DESCRIPTION OF THE DRAWINGS

FIG. 3 shows an input device with a gaming-grade independent key plate system, according to certain embodiments.

FIG. 4A shows an input device with an improved integrated key plate system, according to certain embodiments.

FIG. 4B shows an input device with an improved integrated key plate system, according to certain embodiments.

DETAILED DESCRIPTION

Figure 1:
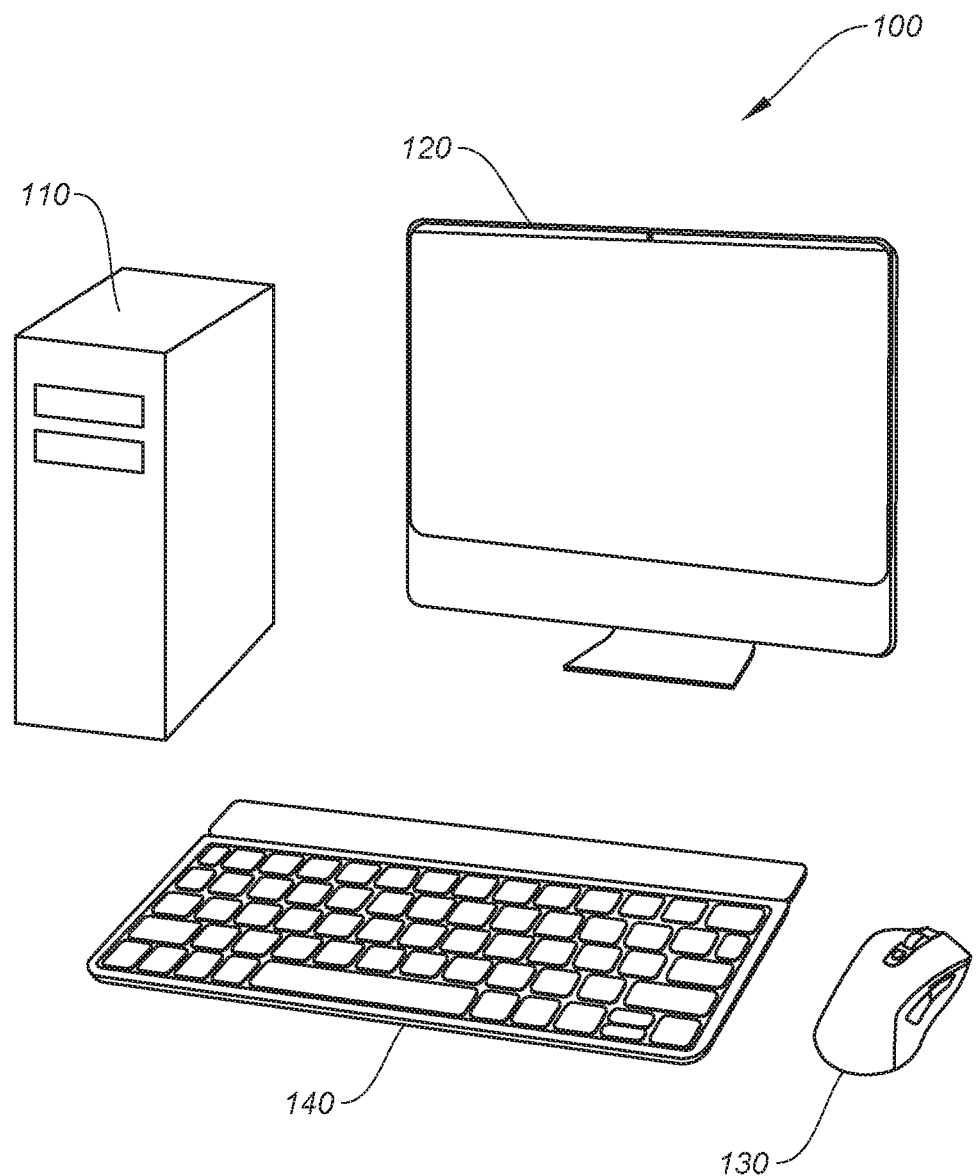
FIG. 1 shows a simplified diagram of a computer system, according to certain embodiments.

Embodiments of this invention are generally directed to input devices. More specifically, systems and devices relate to an improved integrated key plate system for an input device.

In the following description, for purposes of explanation, numerous examples and details are set forth in order to provide an understanding of embodiments of the present invention. It will be evident, however, to one skilled in the art that certain embodiments can be practiced without some of these details, or can be practiced with modifications or equivalents thereof.

Certain embodiments of the invention include an input device (e.g., computer mouse) with at least one high precision button (e.g., key plate) that exhibits consistent and reliable performance characteristics over tens of thousands of hours of use or more. In some aspects, the consistency between button presses is made possible, in part, by a biasing mechanism (e.g., a spring). In conventional designs, key plate configurations typically include a space between the key plate and an underlying actuator (e.g., switch) when the key plate is not depressed (e.g., default setting). In such designs, a certain amount of depression force is needed to cause the key plate to deflect downwards to contact the actuator, and an additional amount of force may be needed to cause the actuator to activate (e.g., generate a control signal). The amount of force needed to cause the key plate to deflect downwards, traverse the space, and contact the actuator can vary based on manufacturing tolerances associated with the rigidity or flexibility of the key plate, assembly tolerances, and the like. In certain embodiments, a biasing mechanism may pre-load the key plate with a downwards force that causes the key plate to normally (i.e., by default) contact an actuator (e.g., force sensor, switch) such that the force needed to deflect the key plate downwards, and its corresponding inherent variability between input devices, may be effectively bypassed. Thus, such embodiments can provide a consistent and reliable button press performance because the key plate depression force is reduced by the pre-load spring, leaving less force needed to activate the actuator, which may have comparatively little variation (e.g., approximately +/−15 g of variation between successive activations).

Some implementations of input devices may include a chassis, a housing coupled to the chassis that forms a top surface of the input device, a depressible key plate integrated with and forming a part of the housing, a biasing mechanism (e.g., a spring) disposed within the housing and coupled to a bottom portion of the key plate to provide a downward force on the key plate, and a force sensor (e.g., actuator) disposed in the chassis and in contact with the bottom portion of the key plate to activate in response to receiving a threshold force (e.g., 60 gf+/−15 gf) by the bottom surface of the key plate. The key plate may depress in response to receiving at least a depression force on the top surface. In some cases, the downward force provided by the biasing mechanism can be substantially equal to the depression force.

In certain embodiments, the housing may further include a knuckle support region. The key plate can be a cantilever beam such that the key plate depresses with respect to the knuckle support region of the housing (i.e., where the key plate attaches to the housing). A support assembly can be disposed under the housing that includes a first support end coupled to a bottom portion of the housing in the knuckle support region and a second support end that extends to the bottom portion of the key plate without contacting the bottom portion of the key plate, where the biasing mechanism is further coupled to the second support end to provide an anchor point for providing the downward force on the key plate. The biasing mechanism can be further coupled to the chassis to provide an anchor point for providing the downward force on the key plate.

FIG. 1 is a simplified diagram of a computer system 100, according to certain embodiments. Computer system 100 can include computer 110, monitor 120, input device 130, and keyboard 140. In some embodiments, input device 130 can be a computer mouse, a remote control device, a game controller (e.g., game pad, joystick, game controller, etc.), a mobile device, or any other suitable device that can be used to convert analog inputs into digital signals for computer processing. For computer system 100, input device 130 can be configured to control various aspects of computer 110 and monitor 120.

Computer 110 can be any suitable computing device including, but not limited to, a desktop computer, a laptop computer, a tablet or "phablet" computer, a smart phone, a PDA, a wearable devices (e.g., smart watches, smart glasses), or the like. In some embodiments, input device 130 can be configured to provide control signals for movement tracking (e.g., x-y movement on a planar surface, three-dimensional "in-air" movements, etc.), touch and/or gesture detection, lift detection, orientation detection, power management capabilities, input detection (e.g., buttons, scroll wheels, etc.), output functions (e.g., LED control, haptic feedback, etc.), or any of a myriad of additional features that would be understood by one of ordinary skill in the art. Computer 110 may include a machine readable medium (not shown) that is configured to store computer code, such as mouse driver software, where the computer code is executable by a processor (see, e.g., processor 210) of computer 110 to control aspects of computer 110 via input device 130 and/or keyboard 140. The various embodiments described herein generally refer to input device 130 as a computer mouse or similar input device, however it should be understood that input device 130 can be any suitable input/output (I/O) device (e.g., user interface device, control device, input unit, or the like) that may be adapted to utilize the novel embodiments described and/or contemplated herein.

Figure 2:
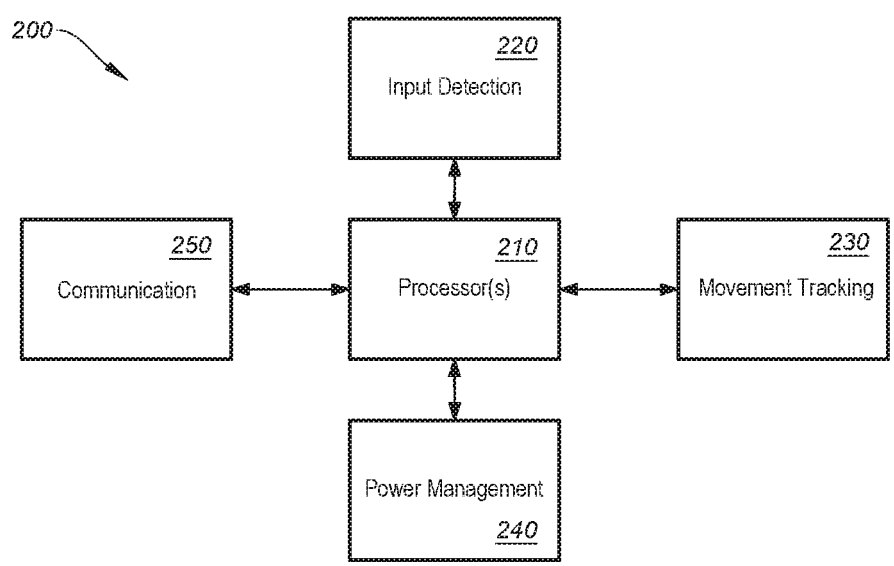
FIG. 2 shows a simplified block diagram of a system to operate an input device, according to certain embodiments.

FIG. 2 shows a simplified block diagram of a system 200 to operate input device 130, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or discussed to prevent obfuscation of the novel features described herein.

In certain embodiments, processor(s) 210 may include one or more microprocessors (μCs) and can be configured to control the operation of system 200. Alternatively, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, and the like, may be configured in other system blocks of system 200. For example, communications block 250 may include a local processor to control communication with computer 110 (e.g., via Bluetooth, Bluetooth LE, RF, IR, hardwire, ZigBee, ZWave, Logitech Unifying, or other communication protocol). In some embodiments, multiple processors may enable increased performance characteristics in system 200 (e.g., speed and bandwidth). It should be noted that although multiple processors may improve system performance, they are not required, nor germane to the operation of the embodiments described herein.

Figure 7:
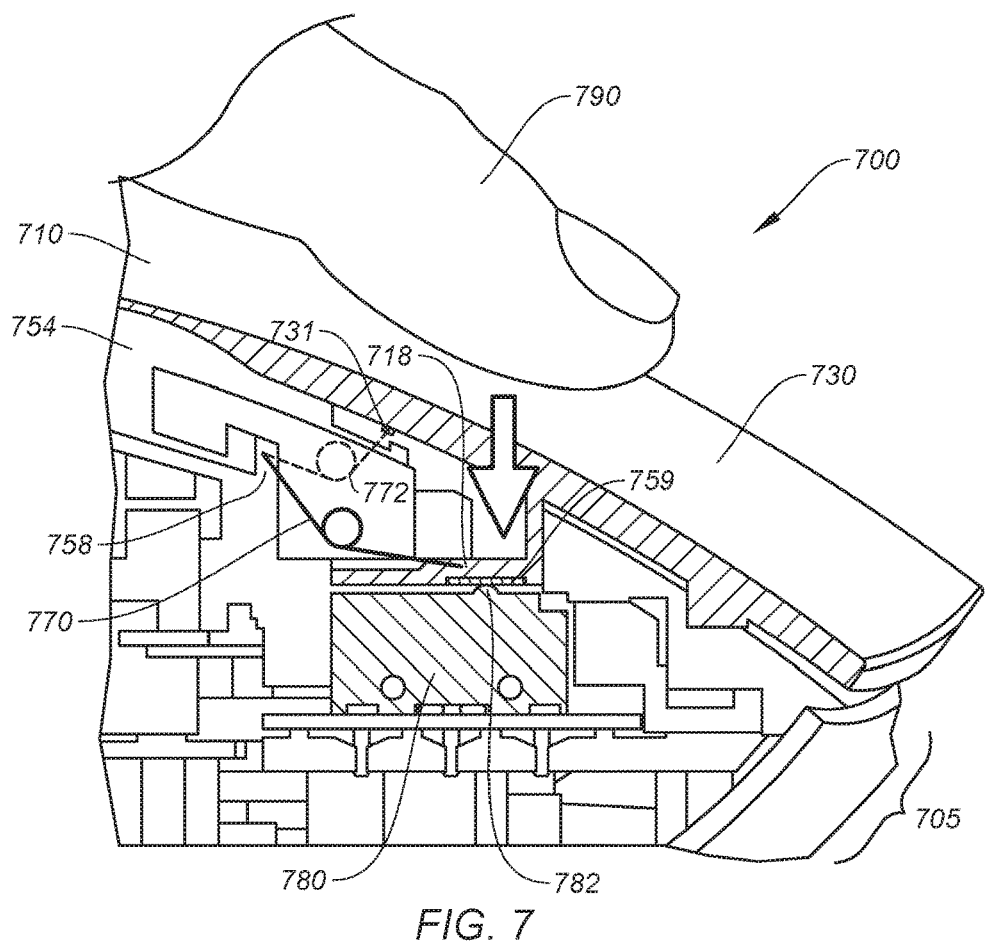
FIG. 7 shows a cutaway side view of an input device with an integrated key plate system, according to certain embodiments.

Input detection block 220 can control the detection of button activation (e.g., main buttons, side buttons, a scroll wheel button, etc.), scroll wheel and/or trackball manipulation (e.g., rotation detection), sliders, switches, touch sensors (e.g., one and/or two-dimensional touch pads), and the like. In some embodiments, input detection block 220 can detect when a key plate (e.g., key plate 320) is depressed with a sufficient force (e.g., threshold force) such that it contacts and activates a force sensor (e.g., actuator). The force sensor may generate a corresponding control signal (e.g., human interface device (HID) signal) to control a computing device (e.g., computer 110) communicatively coupled to the input device (e.g., instantiating a "left click" on the computer). In some implementations, input detection block 220 (or other suitable block, such as processor(s) 210) can control a biasing mechanism (e.g., spring 770). For instance, a biasing mechanism may be adjustable and automatically (and/or manually) controlled (e.g., via software) to adjust an amount of force to activate a force sensor, as further discussed below with respect to FIG. 7. In some cases, a force sensor (e.g., switch), as shown in FIG. 7, may be controlled by processor 210 and/or input detection block 220. Alternatively, the functions of input detection block 220 can be subsumed by processor 210, or in combination therewith.

In some embodiments, input detection block 220 can detect a touch or touch gesture on one or more touch sensitive surfaces on input device 130. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 130 may or may not utilize touch detection or touch sensing capabilities.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with some microphones to detect the modification of the wave propagation pattern related to touch points, etc.), or the like.

Movement tracking block 230 can be configured to track a movement of input device 130. Movement tracking block 230 can use optical sensors such as light-emitting diodes (LEDs) or an imaging array of photodiodes to detect a movement of input device 130 relative to an underlying surface. Input device 130 may optionally include movement tracking hardware that utilizes coherent (laser) light. In certain embodiments, one or more optical sensors are disposed on the bottom side of input device 130 (not shown). Movement tracking block 230 can provide positional data (e.g., X-Y coordinate data) or lift detection data. For example, an optical sensor can detect when a user lifts input device 130 off of a work surface and can send that data to processor 210 for further processing.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if input device 130 has been lifted off of a surface and provide movement data that may include the velocity, physical orientation, and acceleration of input device 130. In some embodiments, gyroscope(s) can be used in lieu of or in conjunction with accelerometer(s) to determine movement or input device orientation.

Power management block 240 can be configured to manage power distribution, recharging, power efficiency, and the like, for input device 130. In some embodiments, power management block 240 can include a battery (not shown), a USB based recharging system for the battery (not shown), power management devices (e.g., low-dropout voltage regulators—not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to provide communication capabilities with computer 110, or other devices and/or peripherals, according to certain embodiments. Communications block 250 can be configured to provide wireless connectivity (e.g., radio-frequency (RF), Bluetooth, BLE, infra-red (IR), ZigBee, Z-Wave, Logitech Unifying, or the like) to computer 110 or other wireless devices. System 200 may include a hardwired connection to computer 110 (e.g., USB, FireWire, etc.). For example, input device 130 can be configured to receive a Universal Serial Bus (USB) cable to enable bi-directional electronic communication with computer 110 or other external devices. Some embodiments may utilize different types of cables or connection protocol standards to establish hardwired communication with other entities.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Embodiments of the present invention can be realized in a variety of apparatuses including electronic devices implemented using any combination of circuitry and software. Furthermore, aspects and/or portions of system 200 may be combined with or operated by other sub-systems as informed by design. For example, power management 240 may be integrated with processor(s) 210 instead of functioning as a separate entity.

Improved "Gaming Grade" Key Plate System—Independent Key Plates

In some embodiments, high performance input devices, such as computer mice, may use gaming-grade key plate assemblies (e.g., left and right mouse buttons) to provide consistent, high-precision performance over long term use. This can be dependent upon an ability to accurately control the position of a key actuator height relative to an underlying switch. If the heights are not aligned, there may be too much pre-travel, which may reduce key press responsiveness, or too much pre-load, which may cause interference and accidental key presses. Both conditions are undesirable in gaming grade devices. Pre-travel and pre-load conditions are further discussed below.

One example, shown in FIG. 3, includes input device 300 with a gaming-grade independent key plate system, according to certain embodiments. Input device 300 can include chassis 305 and housing 310 coupled to chassis 305. Housing 310 can include palm region 312, knuckle support region 314, left key plate 320, and right key plate 330. Input device 300 can further include scroll wheel 340 and buttons 345, as well as any other suitable input elements (e.g., additional buttons, scroll wheels, touch sensors, etc.) or output elements (e.g., light emitting diodes (LEDs), displays, etc.), as would be understood by one of ordinary skill in the art. Knuckle support region 314 may correspond to an area on the top surface of housing 310 that an underside of a user's knuckles rests on or over during a typical usage of input device 300. A palm support region may correspond to an area on the top surface of housing 310 that a user's palm rests on or over during a typical usage of input device 300.

In some embodiments, left key plate 320 and right key plate 330 may be separate from both housing 310 and chassis 305, forming independent structures. Input device 300 may include a plastic hinge for each independent key plate assembly hidden inside the input device Some embodiments may utilize a flat hinge with a tunable hinge force provided by a biasing mechanism (e.g., spring) to change (typically reduce) an amount of overall force required to depress the key plate and cause an underlying force sensor (e.g., switch) to be activated (i.e., by controlling the position of a key actuator height relative to an underlying switch). This is described in U.S. patent application Ser. No. 15/145,186, which is herein incorporated by reference in its entirety for all purposes. Some systems may reduce the amount of force required to activate the force sensor by approximately 6-10 gf. Ranges can vary depending on the type of biasing mechanism, its configuration within the key plate assembly, and the like, as would be understood by one of ordinary skill in the art with the benefit of this disclosure.

While independent key plate assemblies (also referred to as "standard keys") can provide excellent performance characteristics, they may limit marketing options with respect to placing patterns, logos, graphics, etc., on the top of the input device due to the gaps between each of the key plates 320, 330 and knuckle region 314. For instance, silk screening images on an input device may be difficult or not cost effective due to the gaps between the key plates and knuckle region.

Improved "Gaming Grade" Key Plate System—Integrated Key Plates

In certain embodiments, one or more key plates can be integrated with the knuckle region to form, e.g., a unitary body. Integrated key plate systems may allow for a much larger continuous surface area on the top of the input device as there may be no gaps between the key plates and/or knuckle region. Thus, the substantially increased surface area may allow for a much easier and cost-effective application of patterning, designs, and logos (e.g., via silk screening, decals, dyes, paints, etc.). Despite the aesthetic advantages with integrated key plate systems, there can be challenges with respect to achieving gaming-grade performance characteristics.

For example, the hinge of an integrated key is typically incorporated into and dependent on the outside industrial design (i.e., shape, geometry) of the part (e.g., combination key plate(s) and knuckle region), which can result in performance variation between key plates—particularly when the key plates are not the same size. Greater curvature of the key plate may result in a greater required force to activate the force sensor (e.g., actuator, switch). Wider key plates tend to require more depression force than thinner key plates. Typically, integrated key plates have a hinge force (i.e., a force to depress the key plate) in the range of 20-30 gram-force (gf), which may be perceived as a relatively high to discerning users (e.g., gamers). Thus, embodiments that use two or more key plates may have some differences in hinge design (i.e., key plate design) such that one key plate may have a higher corresponding activation force (e.g., amount of force to activate a switch) than an adjacent key plate. Another challenge with integrated keys is that they are typically long and use long parts, making controlling a position of the key actuator (discussed below at least with respect to FIGS. 6A-7) relative to the corresponding switch difficult to calibrate (e.g., set to a near zero distance between the key actuator and switch).

A goal of certain high-performance input devices is to achieve a gaming grade main key click experience on embodiments with integrated key plate assemblies. This can be dependent upon an ability to accurately control the position of a key actuator height relative to an underlying switch. If the heights are not aligned, there may be too much pre-travel, which may reduce key press responsiveness, or too much pre-load, which may cause interference and accidental key presses. Both conditions are undesirable in gaming grade devices.

The height of a key actuator and underlying switch can be more difficult to control in integrated key plate systems as compared to standard key implementations for the reasons indicated above. Nevertheless, preferred embodiments can be configured to eliminate or greatly reduce pre-travel and/or pre-load conditions. Pre-travel can be a distance that the key plate and its corresponding key actuator (e.g., see key actuators 657, 659 of FIG. 6) needs to travel when depressed before contacting and underlying force sensor (e.g., switch, actuator, "switch actuator"). Pre-travel conditions may create an uneven or discontinuous feel for the user (e.g., see FIG. 9) as a first force causes the key plate to be depressed and an additional greater force needed to depress the switch. Thus, the perceived transition between the pre-travel (i.e., key plate depression) force and the switch depression force can degrade the user experience. Good pre-travel distances may typically range from 0.0-0.3 mm for gaming grade performance. A zero or near-zero pre-travel can make key actuation more responsive, faster, and more consistent as the force to depress the key plate through the pre-travel gap is eliminated. Further, many of the factors of key plate performance variation discussed above (e.g., key plate length, width, etc.) can be greatly reduced or effectively eliminated as they may tend to have greater detrimental effect during the pre-travel phase of key plate activation (i.e., key press event).

Pre-load can be an amount of force applied to a key plate in a default (i.e., at rest) condition. For example, a biasing mechanism (e.g., a spring) may be coupled directly or indirectly to a key plate to apply a downward force (e.g., toward an underlying force sensor) to, for example, reduce or eliminate pre-travel. However, too much pre-load may cause an accidental key press event. For instance, if a biasing mechanism provides too much downward force, then both the force to overcome pre-travel and some or all of the additional force needed to activate the underlying switch may be exceeded, which may cause an inadvertent button press, even when a user is simply resting a finger on the key plate, or in some cases, not touching the key plate at all. Thus, a poorly calibrated pre-load may overcome undesirable pre-travel conditions, however it can also create an unreliable user experience as well.

Thus, embodiments described herein are configured to have as close to zero pre-travel as possible (i.e., caused by a gap between the key actuator (see, e.g., key actuator 759 of FIG. 7) and switch actuator (see, e.g., switch plunger 782 of FIG. 7), which is typically close to 0.1 mm or less, and a controlled pre-load condition (e.g., via a biasing mechanism) so that the key actuator is not over-pressing the switch actuator (e.g., 60 gf switch) to create inadvertent or inconsistent key activations.

FIGS. 4A and 4B show input device 400 with an improved integrated key plate system, according to certain embodiments. Input device 400 can include chassis 405 and housing 410 coupled to chassis 405. Housing 410 can include palm region 412, knuckle region 414, left key plate 420, and right key plate 430, which can be integrated into a single unitary body. Input device 400 can further include scroll wheel 440 and buttons 445. Input device 400 can include any number of additional buttons, scroll wheels, touch sensors, etc.

Knuckle support region 414 may correspond to an area on the top surface of housing 410 that an underside of a user's knuckles rests on during a typical usage of input device 400. Palm support region 412 may correspond to an area on the top surface of housing 410 that a user's palm rests on during a typical usage of input device 400.

Left key plate 420 and right key plate 430 can be integrated with housing 410 forming a unit structure. Left key plate 420 (e.g., first key plate) can be comprised of any suitable material such that it deflects when a threshold force is applied to its top surface (e.g., when a user depresses the key plate). In some embodiments, the key hinge force should be as low as possible. For integrated keys, the key hinge force may be approximately 10-15 gf. Alternative embodiments may have one key plate, three key plates, or other number of key plates. Key plates 420, 430 can be of any size, dimension, and/or location on input device 400 including any location on housing 410 and additionally or alternatively on chassis 405. Key plates 420, 430 may be substantially the same size (e.g., within 5 mm$^2$ surface area with similar dimensions) or may differ in size (e.g., key plate 420 may be larger than key plate 430). In some embodiments, key plates 420, 430 can operate as cantilever beams such that the key plate depresses with respect to a non-moving region of housing 410 (e.g., knuckle support region 414), as further discussed below.

Integrated Key Plate System and Support Assembly

Certain embodiments may utilize a simple mechanism ("support assembly") attached to the integrated key(s) to provide a force (e.g., via a spring) that can control an amount of pre-travel and pre-load in the key plate system. In exemplary embodiments, the mechanism and spring may provide enough downward force to overcome the hinge force (e.g., amount of force to cause the key plate to deflect downward), create a zero gap between the key actuator and the underlying switch, and maintain an acceptable pre-load condition that does not overcome the switch plunger minimum force (e.g., 45 gf for switch activation), which may vary by design (e.g., switch activation force is typically 30-70 gf, and 60 gf+/−15 gf in particular embodiments). In some cases, the biasing mechanism can provide approximately 10-30 gf, and 20 gf in exemplary embodiments, depending on the pre-load spring design for the particular system.

Conceptually, a primary function of the support assembly is to provide a fixed structure to anchor the biasing mechanism (e.g., a spring) to provide a force on a corresponding key plate to control pre-travel and pre-load settings. The biasing mechanism may either push or pull the key plate downwards toward the force sensor, depending on the particular configuration. Either method of force delivery (i.e., push or pull) can be effective and are contemplated herein, however the embodiments described and depicted in this document are largely directed to biasing mechanisms that push down on a portion of the key plate.

Any fixed structure can be used as an anchor point for the biasing mechanism provided that it preferably does not move. In some cases, the chassis may provide a fixed structure to anchor the biasing mechanism. Alternatively or additionally, fixed portions of the housing can provide an exemplary anchoring point. For example, the knuckle region and/or the palm region are fixed and/or do not appreciably move when the one or more key plates are pressed. It can be advantageous to anchor the biasing mechanism as close to the key actuator (i.e., the portion of the key plate that contacts the force sensor) as possible as this is typically a point of relatively high leverage on the key plate, which can function like a cantilever beam. Points of relatively high leverage may allow the smaller amount of downward force to eliminate pre-travel in the corresponding key plate. As the anchor point for the biasing mechanism moves farther from points of relatively higher leverage, more force is required to achieve the same key plate deflection. Thus, anchoring the biasing mechanism at locations with higher leverage points typically allows smaller components (e.g., smaller springs) to be used, which can provide both cost benefits and economy of space.

As indicated above, the support structure can be coupled to (i.e. anchored to) fixed portions of the housing. The closest fixed portion of the housing can be the knuckle support region, according to certain embodiments. However, the knuckle support region can be at a relatively far distance from the key actuator, which may be a non-optimal point of leverage. Thus, certain embodiments include support arms (e.g., one for each key plate) that extend from the coupling point of the support structure to the knuckle support region of the housing to a point at or near the location of the key actuator for an improved point of leverage. The support arm can be rigid and in a "floating" arrangement so that it extends along the length of the key plate without contacting it when the key plate is both at rest and fully depressed. The biasing mechanism may be anchored to an end portion of the support arm ("support end") and coupled to the key plate at or near the key actuator to provide a downward force (e.g., 20-40 gf) to reduce or eliminate pre-travel and provide an acceptable pre-load on the key plate.

As indicated above, the support assembly can be disposed under the housing (e.g., coupled to the housing via hardware, friction/mechanical fit, and/or adhesive) and can include a first support end on a support arm coupled to a bottom portion of the housing in the knuckle support region and a second support end on a second support arm that extends to the bottom portion of the key plate without contacting the bottom portion of the key plate. The biasing mechanism can be coupled to a bottom portion of the key plate and coupled to the second support end to provide an anchor point for providing a downward force on the key plate. In alternative embodiments, the biasing mechanism may be coupled to the chassis instead of a support assembly.

Figure 5:
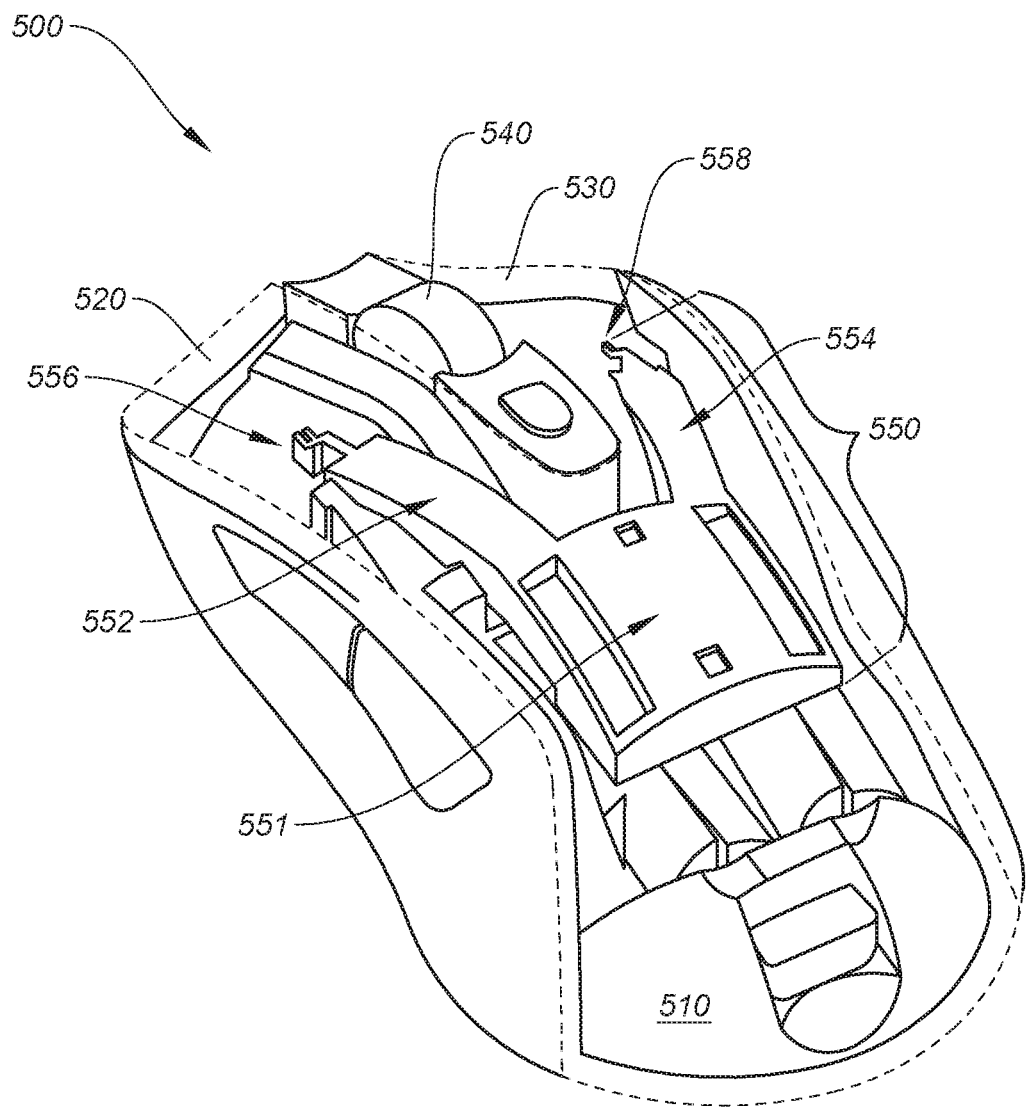
FIG. 5 shows an input device with an integrated key plate system, according to certain embodiments.

FIG. 5 shows input device 500 with an integrated key plate system, according to certain embodiments. Input device 500 includes chassis 505 and housing 510 coupled thereto. Housing 510 includes left key plate 520, right key plate 530, a knuckle region, and a palm region, and is shown with a transparent surface to expose the inner components of input device 500. Support assembly 550 includes body 551, support arm 552, support arm 554, biasing mechanism anchor point ("anchor point") 556, and anchor point 558. Body 551 of support assembly 550 can be coupled to housing 510 at or near the knuckle support region using hardware (e.g., screws, pins, tabs, etc.), frictional or mechanical connections, adhesive, or a combination thereof. Support arms 552, 554 extend from body 551 to a location at or near the key actuators on left/right key plates 520, 530. Anchor points 556, 558 are configured to fit inside support arm housings ("housings") that extend from the bottom surface of the key plates and envelop anchor points 556, 558 to provide a surface for the biasing mechanism to push down on, as further described below.

Figure 6A:
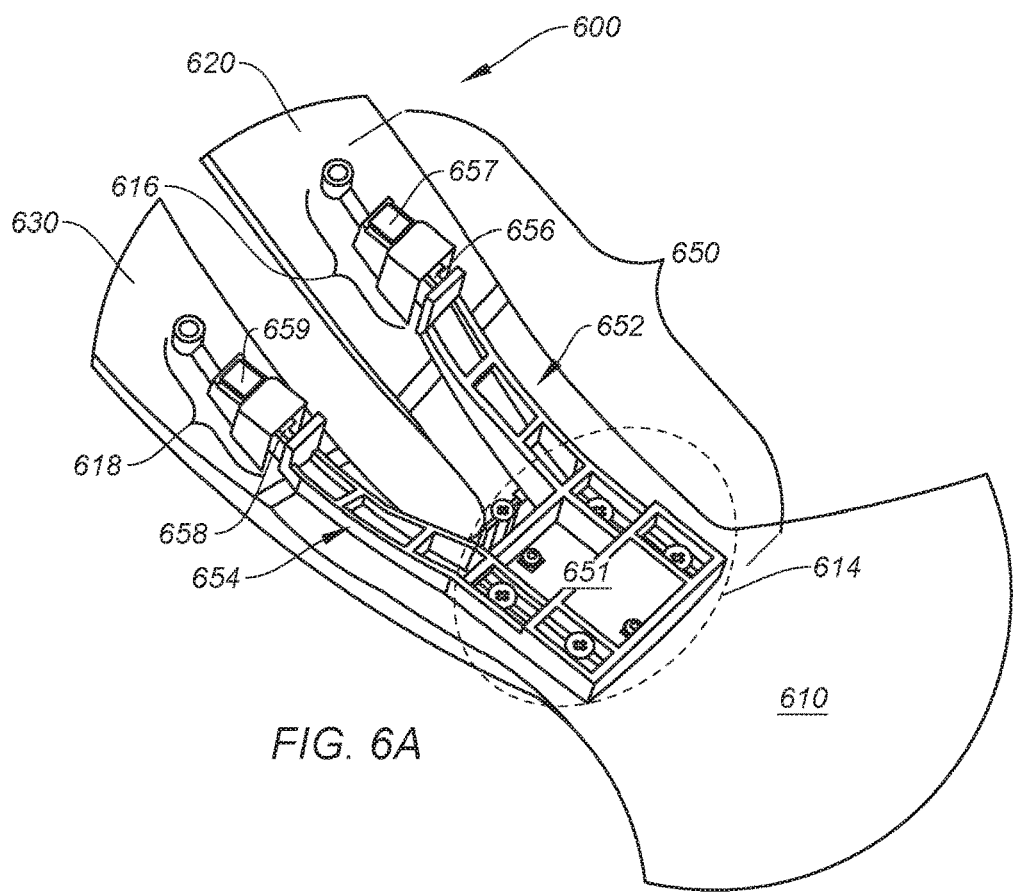
FIG. 6A shows a support assembly coupled to a housing of an integrated key plate system for an input device, according to certain embodiments.

FIG. 6A shows a support assembly 650 coupled to housing 610 of an integrated key plate system for an input device, according to certain embodiments. Housing 610 includes left key plate 620, right key plate 630, knuckle region 614, and a palm region (not labeled). Support assembly 650 includes body 651, support arm 652, support arm 654, actuator housing 616, and actuator housing 618. Actuator housings 616, 618 can include key actuators 657, 659 disposed thereon, respectively. The key actuators contact the force sensor when their corresponding key plate is depressed. Body 651 of support assembly 650 can be coupled to housing 610 at the knuckle support region using hardware (e.g., screws, pins, tabs, etc.), frictional or mechanical coupling, adhesive, or a combination thereof. Support arms 652, 654 extend from body 651 to a location at or near the key actuators on left/right key plates 620, 630. Actuator housings 616, 618 each include corresponding key actuators 657, 659 and anchor points 656, 658 to attach the biasing mechanism, as further discussed below.

Figure 6B:
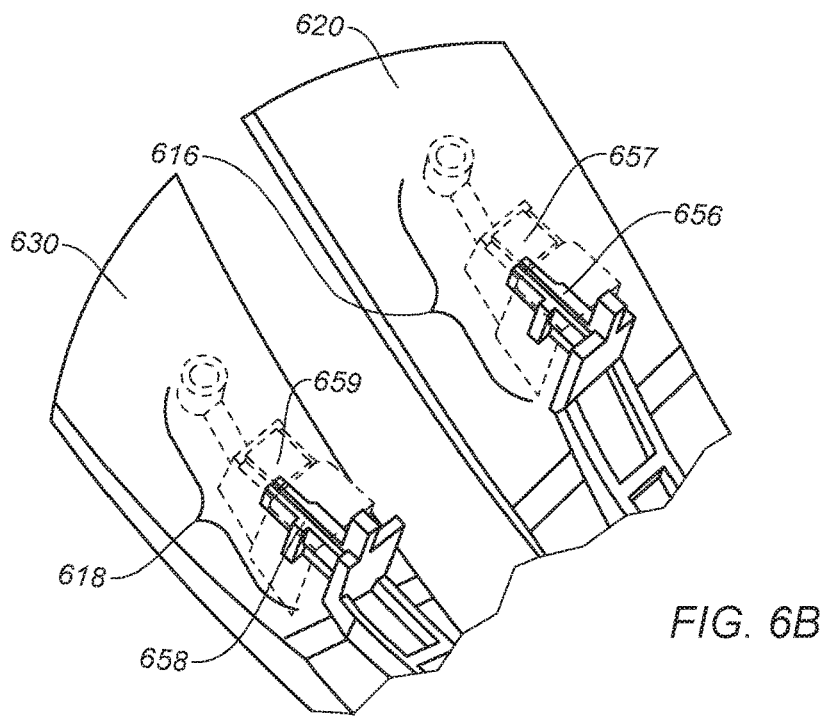
FIG. 6B shows a close up view of a top portion of a support assembly and housing, according to certain embodiments
Figure 6C:
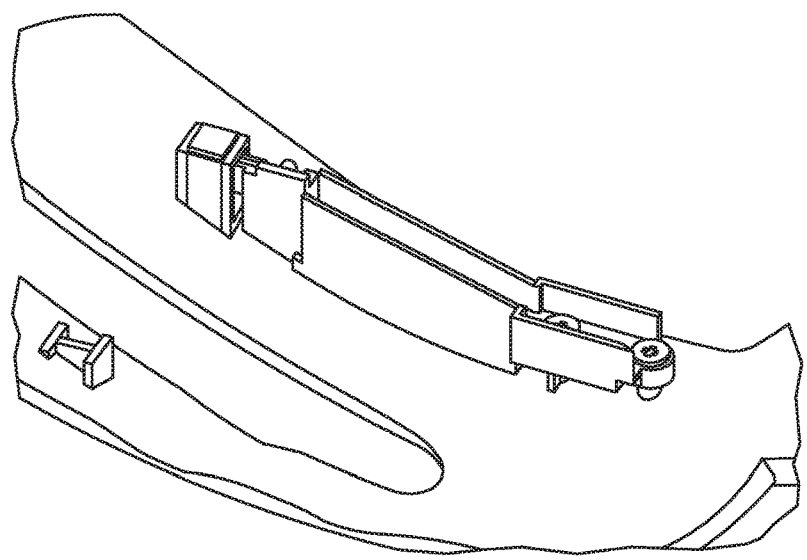
FIG. 6C shows an alternative support assembly system using a single support arm, according to certain embodiments.

FIG. 6B shows a close up view of a top portion of support assembly 650 and housing 610, according to certain embodiments. Actuator housings 616, 618 are shown in a transparent view to expose the anchor points seated (inserted) therein (for discussion purposes). That is, anchor point 658 of support arm 654 can be seated inside actuator housing 618, which may be coupled to or integrated with key plate 630. Similarly, anchor points 656 of support arm 652 can be seated inside actuator housing 616, which may be coupled to or integrated with key plate 620. FIG. 6C shows an alternative support assembly system using a single support arm, according to certain embodiments.

FIG. 7 shows a cutaway side view of an input device with an integrated key plate system, according to certain embodiments. Input device 700 can include chassis 705 and housing 710 coupled thereto. Housing 710 may include key plate 730 and actuator housing 718. Actuator housing 718 can include key actuator 759. Input device 700 may further include force sensor 780 with switch plunger 782 (or equivalent feature), and support arm 754 of a support assembly (not shown in its entirety—see FIG. 6A for reference). Switch plunger 782 may be the portion of force sensor 780 that receives (i.e., is directly or indirectly contacted by) key plate 730 via key actuator 759. Biasing mechanism 770 can be coupled to support arm 754 at anchor point 758 of the support assembly at a first end, and coupled to actuator housing 718 at a second end to provide a downward force that pushes down on actuator housing 718 and, by extension, key plate 730. Alternatively or additionally, biasing mechanism 770 can be coupled to support arm 754 at anchor point 758 of the support assembly at a first end, and coupled to coupling point 731 at the bottom of key plate 730 at a second end to provide a downward force that pulls down on key plate 730. One of ordinary skill in the art would understand the many variations, modifications, and alternative embodiments thereof that can provide a downward force by either pulling or pushing (or both) key plate 730. As indicated above, adding a downwards force to key plate 730 in a non-depressed state (e.g., default state, at-rest state) can reduce or eliminate pre-travel and/or control pre-load conditions, as described below with respect to FIGS. 8-11.

Figure 8:
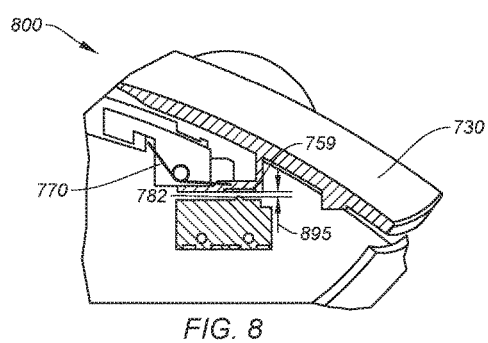
FIG. 8 shows input device with an integrated key plate system, according to certain embodiments.

FIG. 8 shows input device 800 with an integrated key plate system, according to certain embodiments. Input device 800 includes key plate 730, biasing mechanism 770 (e.g., coupled to anchor point 755 and actuator housing 658), forces sensor (e.g., plunger) 782, as discussed above with respect to FIG. 7. Biasing mechanism 770 can provide a downward force on key plate 830. In some embodiments, pre-travel and pre-load conditions can be controlled by tuning the downward force provided by biasing mechanism 770. Some embodiments may be tuned during manufacturing. In some cases, biasing mechanism 770 may be adjustable by software, by manual control (e.g., via an adjustable screw), or a combination thereof. Alternatively, biasing mechanism 770 may not be adjustable. Referring back to FIG. 8, biasing mechanism 770 is not optimally turned as a pre-travel condition 859 exists in a non-depressed state (e.g., default state, at-rest state). The pre-travel condition can be indicative of a biasing mechanism that is not provide enough downward force to cause key plate 730 to overcome an amount of force required to cause key plate 770 to contact switch plunger 782 of force sensor 780.

Figure 9:
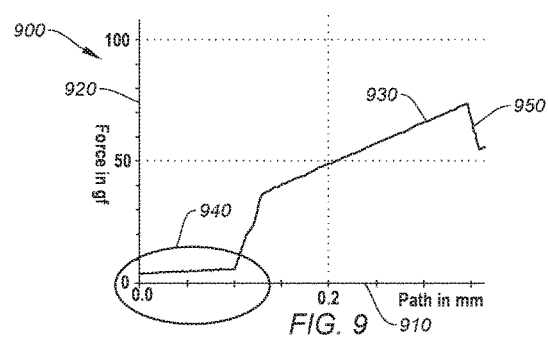
FIG. 9 shows a graph illustrating an effect of pre-travel on a user experience, according to certain embodiments.

FIG. 9 shows a graph 900 illustrating an effect of pre-travel on a user experience, according to certain embodiments. FIG. 9 corresponds to input device 800 with pre-travel condition 859. Graph 900 plots a key press force in gf (gram force) 920 versus key travel path in mm (910) which may corresponds to a downward key plate deflection. The pre-travel condition, which corresponds to region 940, includes key displacement (i.e., movement of key plate 730 about 0.1 mm) but no appreciable increase in force since there is no contact between key actuator 759 and force sensor 780 (e.g., switch plunger 782). At approximately 0.125 mm travel, key actuator 759 makes contact with force sensor 780 and a linear force profile ensues as the switch plunger 782 is depressed over approximately 0.25 mm (or other suitable configuration). The abrupt transition between pre-travel region 940 and linear force sensor region 930 can be noticeable to a user and can significantly reduce the user experience. At region 950, the abrupt reduction in force can correspond to the switch plunger 782 depressing after a requisite force is overcome. Referring to FIG. 9, the requisite force may be about 40 gf. Typical embodiments may utilize force sensors that activate in response to receiving 60 gf+/−20 gf.

Figure 10:
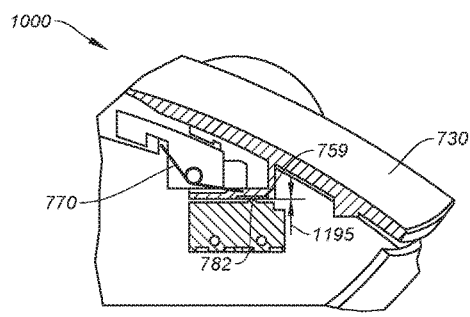
FIG. 10 shows input device with an integrated key plate system, according to certain embodiments.

FIG. 10 shows input device 1000 with an integrated key plate system, according to certain embodiments. Input device 1000 may be similar to the embodiments of FIG. 8, but with no pre-travel in a normal (e.g., default, non-use) state. That is, biasing mechanism 770 has provided at least enough downward force on key plate 730 to overcome the pre-travel distance causing key plate 730 to contact switch plunger 782.

Figure 11:
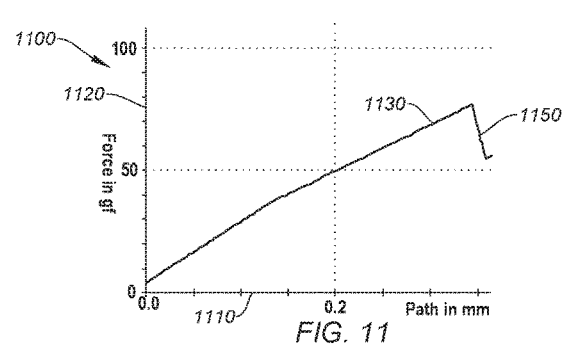
FIG. 11 shows a graph illustrating key plate performance in a tuned integrated key plate system, according to certain embodiments.

FIG. 11 shows a graph 1100 illustrating key plate performance in a tuned integrated key plate system, according to certain embodiments. FIG. 11 may correspond to input device 1000 with zero pre-travel condition 1159. Graph 1100 plots a key press force in gf (gram force) 1120 versus key travel path in mm (1110) which may corresponds to a downward key plate deflection. Unlike the pre-travel condition shown in FIGS. 8-9, no pre-travel condition exists in FIG. 10, and graph 1100 reflects this by showing a near-linear plot of force (e.g., amount of force to depress key plate 730 to register a key press) versus key press distance. The linear or near linear performance curve provide an optimal user experience that manifests as a smooth and consistent key press feel. At region 1150, the abrupt reduction in force can correspond to switch plunger 782 depressing after a requisite force is overcome. Referring to FIG. 11, the requisite force may be about 40 gf. The configuration shown in FIG. 10 is exemplary and shows a good balance for tuning biasing mechanism 770 to eliminate pre-travel without over-compensating with pre-load. Although it is not shown in FIG. 11, an undesirable pre-load condition may cause region 1150 to occur at a much lower applied force (e.g., 20 gf), which would likely cause key plate 730 to be over-sensitive, which could result in inadvertent key presses.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. Furthermore, any of the embodiments described herein, and the components and configurations thereof, can be combined in any suitable manner. For instance, FIGS. 1-10 may refer to a single embodiment or several different embodiments (e.g., with different pre-travel, preload conditions). One of ordinary skill in the art would understand the many variations, modifications, and alternative embodiments thereof.

Alternative Applications of Using a Pre-Loaded System

In addition to applying the principles of pre-loading a system to buttons on an input device, other applications are possible. For example, some common complaints in conventional scroll wheels on computer mice include noisy operation, rattling, and poor performance due, in part, by pre-travel from the wheel actuator to the wheel button. The pre-loading principles described above, at least with respect to FIGS. 4A-11, can be applied to a scroll wheel to improve its operation and reduce and/or eliminate these problems.

Figure 12:
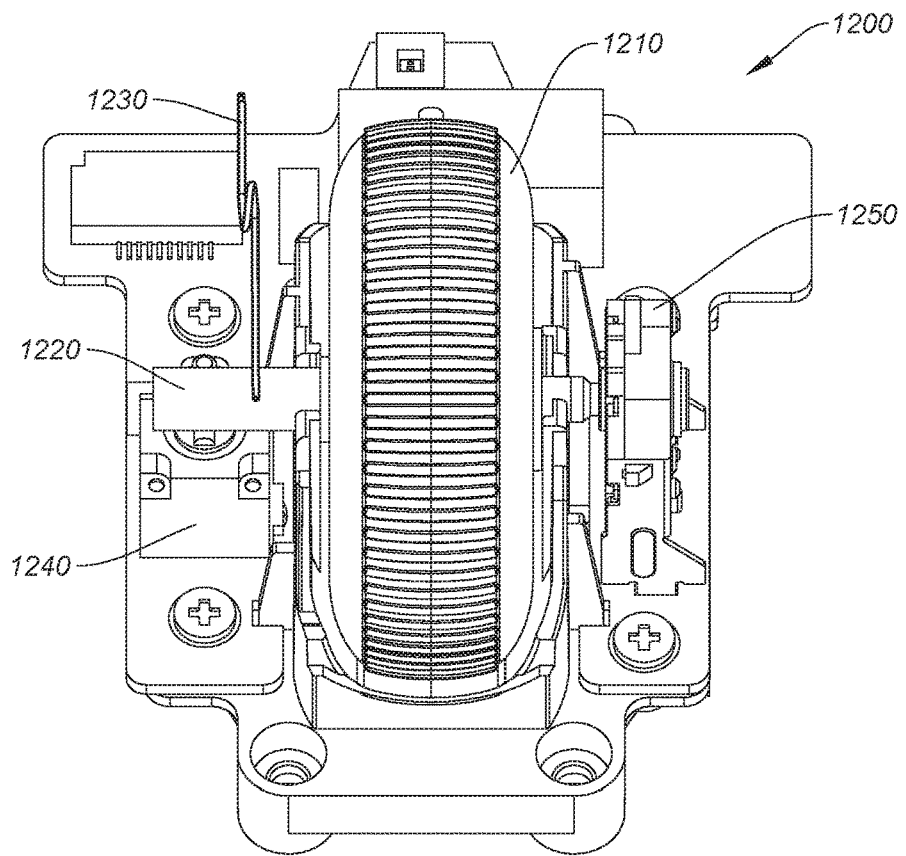
FIG. 12 shows an example of the application of an improved integrated pre-loaded system as applied to a scroll wheel assembly, according to certain embodiments.
Figure 13:
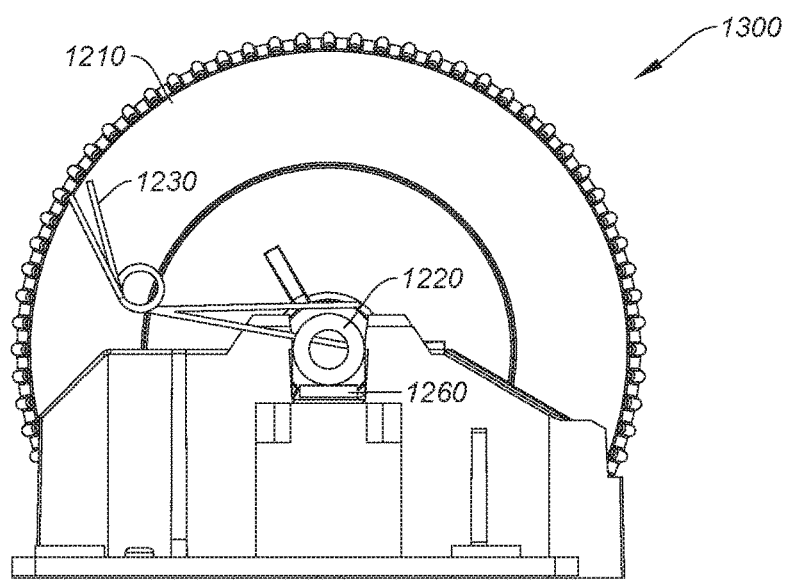
FIG. 13 shows an example of the application of an improved integrated pre-loaded system as applied to a scroll wheel assembly, according to certain embodiments.

FIGS. 12 and 13 show an example of the application of an improved integrated pre-loaded system as applied to a scroll wheel assembly 1200, according to certain embodiments. Scroll wheel assembly 1200 can include scroll wheel 1210, wheel shaft 1220, pre-load spring 1230, middle button switch 1240, mechanical encoder 1250, and switch actuator 1260 (shown in FIG. 13). In operation, pre-load spring 1230 pushes onto wheel shaft 1220, thereby forcing wheel shaft 1220 on to switch actuator 1260. One side of wheel shaft 1220 can be inserted into mechanical encoder 1250 to sense the rotation of the wheel. The opposite side of wheel shaft 1220 may be configured to activate middle button switch 1240. Thus, pre-load spring 1230 pushes down on wheel shaft 1220, causing wheel shaft 1220 to push against middle button switch 1240 via switch actuator 1260. As shown in FIG. 13, pre-load spring 1230 is shown in a pre-load position and in a rest position. Although not explicitly shown, an opposite side of pre-load spring 1230 can be coupled to a portion of the chassis or other suitable anchoring location, as would be understood by one of ordinary skill in the art. This design may bring similar benefits as an integrated pre-loaded key plate does with main keys, including no pre-travel (or reduced pre-travel), improved responsiveness to user inputs, and an improved user experience with less noise and rattle. One of ordinary skill in the art would understand the many variations, modifications, and alternative embodiments thereof that extend beyond merely buttons and scroll wheels, but can apply to any system with an unwanted pre-travel condition in a actuator/switch arrangement.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An input device comprising:
   a chassis;
   a housing coupled to the chassis and forming a top surface of the input device, the housing including a knuckle support region;
   a depressible key plate integrated with and forming a part of the housing such that the housing and depressible key plate form a continuous surface, the key plate including:
      a top portion forming a part of the top surface of the input device; and
      a bottom portion;
   a tuned biasing mechanism disposed within the housing and coupled to the bottom portion of the key plate, the biasing mechanism configured to provide a downward pulling force on the key plate;
   a force sensor disposed in the chassis and in contact with the bottom portion of the key plate, the force sensor to activate in response to receiving a threshold force by the bottom portion of the key plate; and
   a support assembly including:
      a first support end coupled to a bottom side of the housing in the knuckle support region; and
      a second support end that extends to the bottom portion of the key plate without contacting the bottom portion of the key plate, wherein the tuned biasing mechanism is further coupled to the second support end to provide an anchor point for providing the downward pulling force on the key plate.

2. The input device of claim 1 wherein the key plate depresses in response to receiving at least a depression force on the top surface, and
   wherein the downward force provided by the biasing mechanism is substantially equal to the depression force.

3. The input device of claim 1 wherein the biasing mechanism is a spring.

4. The input device of claim 1 wherein the force sensor is an actuator.

5. The input device of claim 1 wherein the key plate is a cantilever beam such that the key plate depresses with respect to the knuckle support region of the housing.

6. The input device of claim 1 further comprising:
   a second depressible key plate integrated with and forming a part of the housing, the second key plate including:
      a top portion forming a second part of the top surface of the input device; and
      a bottom portion;
      a second biasing mechanism disposed within the housing and coupled to the bottom portion of the second key plate, the second biasing mechanism to provide a downward force on the second key plate; and
   a second force sensor disposed in the chassis and in contact with the bottom portion of the second key plate, the second force sensor to activate in response to receiving a second threshold force by the bottom portion of the second key plate.

7. The input device of claim 6 wherein the second key plate depresses in response to receiving at least a second depression force on the top surface, and wherein the downward force provided by the second biasing mechanism is substantially equal to the second depression force.

8. The input device of claim 7 wherein the depression force and the second depression force are not substantially equal.

9. An apparatus comprising:
a housing coupled to a chassis of a computer mouse, the housing forming a top surface of the computer mouse, the housing including a knuckle support region;
a depressible key plate integrated with and forming a part of the housing such that the housing and depressible key plate form a continuous surface, the key plate including:
a top portion forming a part of the top surface of the computer mouse; and
a bottom portion; and
a tuned biasing mechanism disposed within the housing and coupled to the bottom portion of the key plate, the biasing mechanism configured to provide a downward pulling force on the key plate; and
a support assembly including:
a first support end coupled to a bottom side of the housing in the knuckle support region; and
a second support end that extends to the bottom portion of the key plate without contacting the bottom portion of the key plate, wherein the tuned biasing mechanism is further coupled to the second support end to provide an anchor point for providing the downward pulling force on the key plate.

10. The apparatus of claim 9 wherein the bottom portion of the key plate, when the housing is coupled to the chassis, contacts a force sensor disposed in the chassis.

11. The apparatus of claim 10 wherein the force sensor is an actuator.

12. The apparatus of claim 9 wherein the key plate depresses in response to receiving at least a depression force on the top surface, and
wherein the downward force provided by the biasing mechanism is substantially equal to the depression force.

13. The apparatus of claim 9 wherein the biasing mechanism is a spring.

14. The apparatus of claim 9
wherein the key plate is a cantilever beam such that the key plate depresses with respect to the knuckle support region of the housing.

* * * * *